United States Patent [19]

van der Lely

[11] 4,286,427

[45] Sep. 1, 1981

[54] AGRICULTURAL MACHINE

[76] Inventor: Cornelis van der Lely, 7 Brüschenrain, Zug, Switzerland

[21] Appl. No.: 75,986

[22] Filed: Sep. 17, 1979

Related U.S. Application Data

[63] Continuation of Ser. No. 749,172, Dec. 9, 1976, Pat. No. 4,208,863.

[30] Foreign Application Priority Data

Dec. 12, 1975 [NL] Netherlands ......................... 7514498

[51] Int. Cl.³ ............................................ A01D 77/06
[52] U.S. Cl. ......................................... 56/377; 56/370
[58] Field of Search .................. 56/370, 376, 377, 30, 56/48, 27.5, 12.8, 13.3

[56] References Cited

U.S. PATENT DOCUMENTS 1,447,328  3/1923  Rycroft ..................................... 56/48
2,836,951  6/1958  Annis ........................................ 56/30
2,896,398  7/1959  Green ....................................... 56/48
2,929,188  3/1960  Talkington ............................... 56/30
3,611,690  10/1971 Zweegers ............................... 56/366
3,832,838  9/1974  Hale ....................................... 56/377

Primary Examiner—Robert A. Hafer
Attorney, Agent, or Firm—Penrose L. Albright

[57] ABSTRACT

An agricultural machine, such as a haymaker, for the displacement of stalks, comprising a movable air-permeable screen and air displacing arrangement for inducing a pressure difference across the screen thereby to cause stalks to adhere to the screen under the effect of suction. In a preferred embodiment, a blocking member is disposed to prevent the application of suction at one region of the screen to allow stalks adhering to the screen to be deposited. The air displacing arrangement may to provide an air cushion under the machine to support the machine above the ground.

6 Claims, 18 Drawing Figures

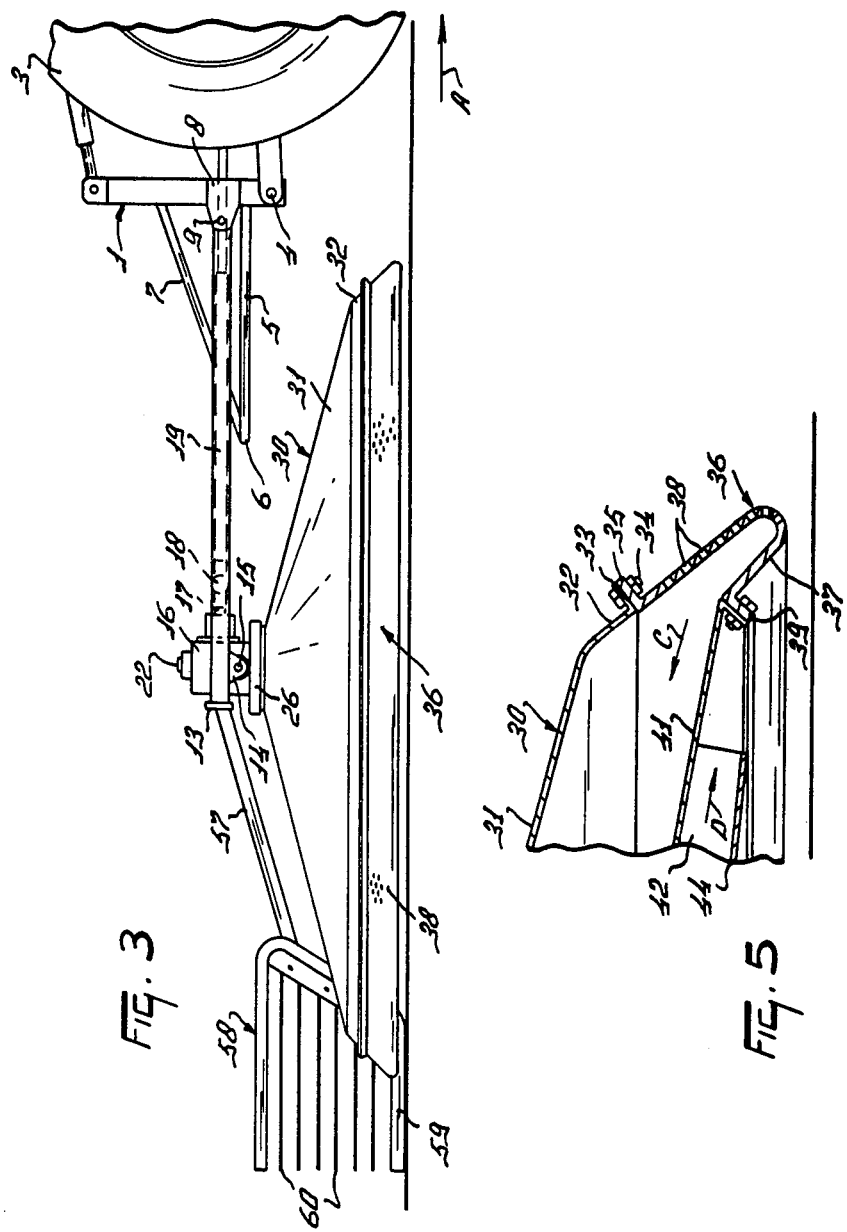

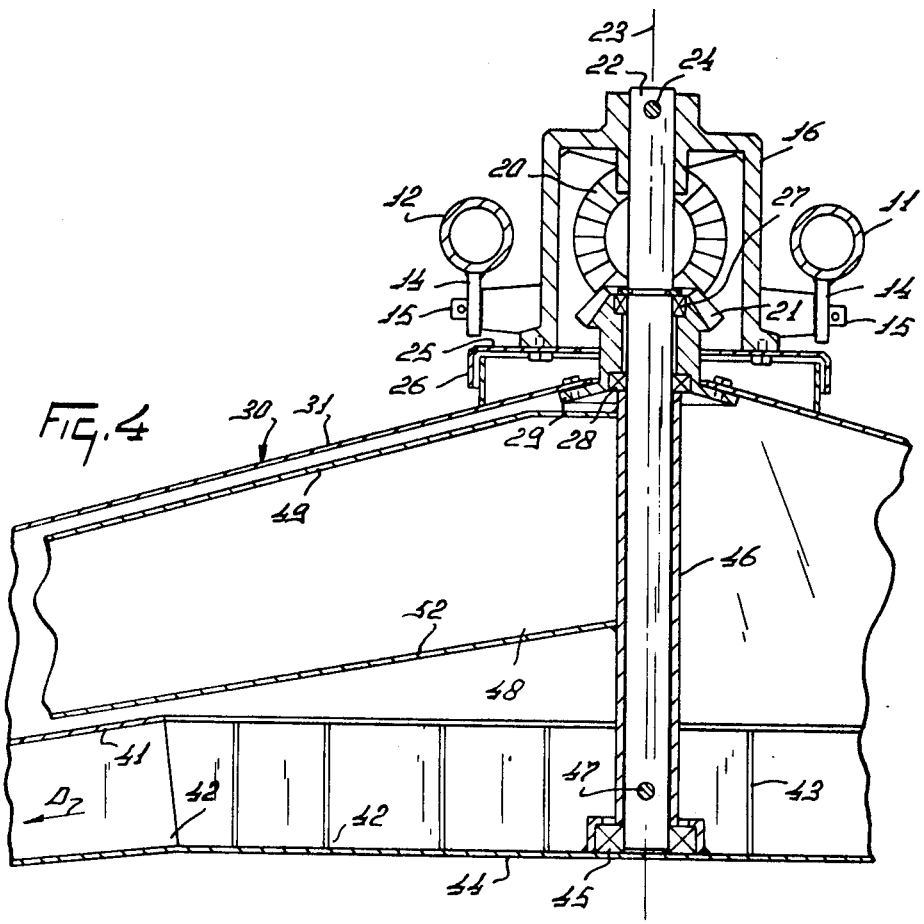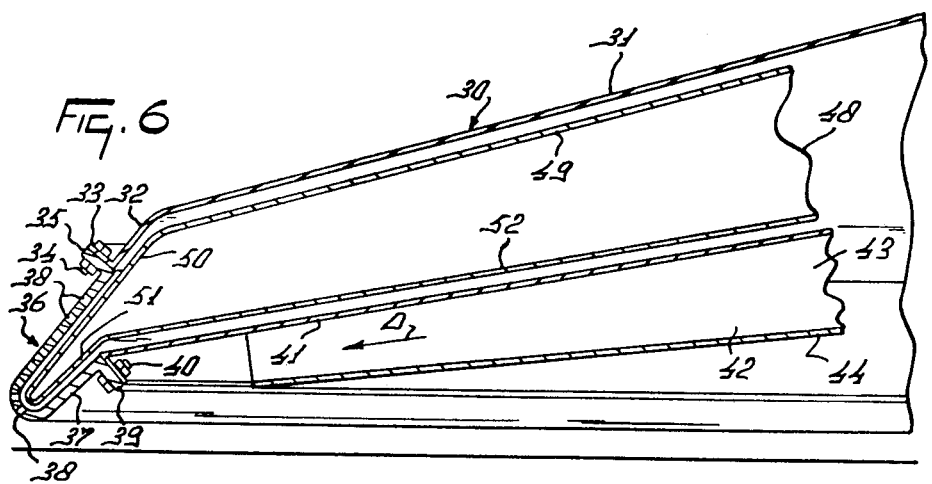

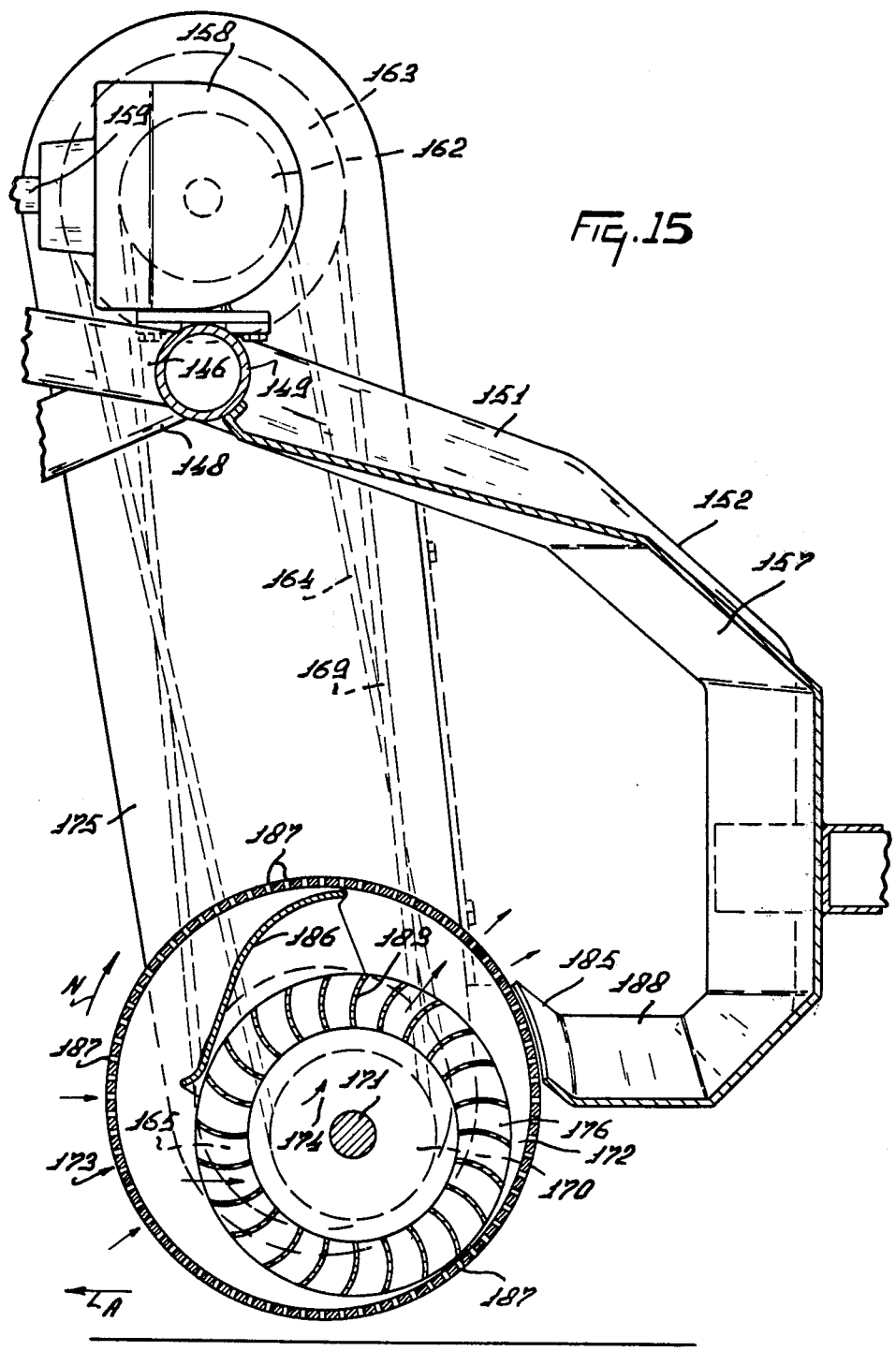

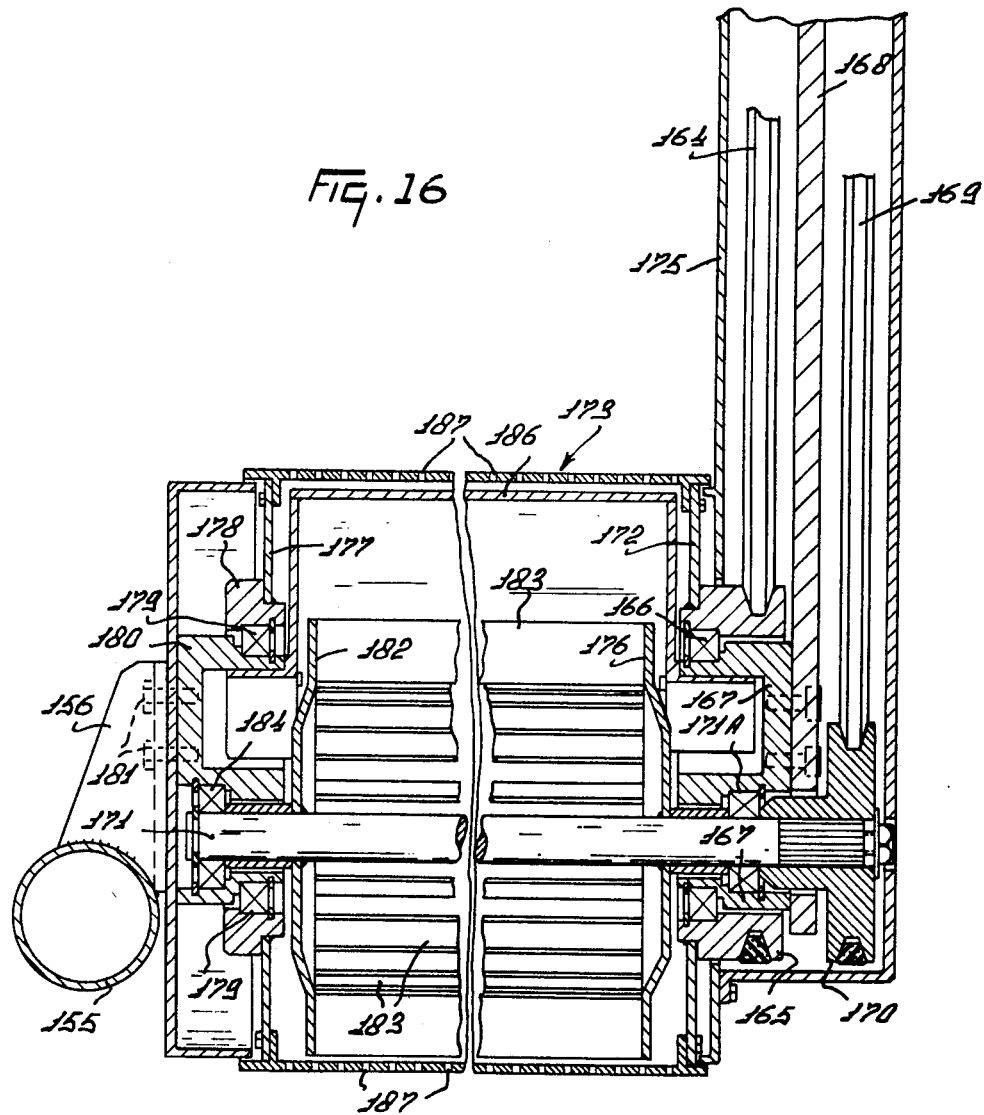

AGRICULTURAL MACHINE

RELATED APPLICATIONS

This is a continuation of Application Ser. No. 749,172, filed Dec. 9, 1976, now U.S. Pat. No. 4,208,863.

BACKGROUND OF THE INVENTION

This invention relates to an agricultural machine comprising a device for displacing stalks, for example a haymaking machine.

Conventional machines employ rotatable tines for displacing the crop.

These conventional machines have the disadvantage that their tines frequently do not pick up the whole crop, particularly stalks or stems lying among the stubble. Moreover, the tines may seriously damage young plants growing among the stubble. Broken-off pieces of tines are often left behind and may spoil the harvested crop and cause damage to machinery.

The invention has for its object to eliminate these disadvantages.

SUMMARY OF THE INVENTION

According to the present invention there is provided an agricultural machine for the displacement of stalks comprising a movable air-permeable screen and air displacing means arranged to induce a pressure difference across the screen thereby to cause stalks to adhere to the screen under the effect of suction.

Using a machine in accordance with the present invention, stalks lying on the ground are very thoroughly picked up and even stalks lying among the stubbles are picked up, while damage of young plants caused by tines is no longer possible.

BRIEF DESCRIPTION OF THE DRAWINGS

FIG. 3 is a side elevation of the machine of FIG. 1 viewed in the direction of the arrow III in FIG. 1.

FIG. 4 is a sectional view taken on the lines IV—IV in FIG. 1.

FIG. 5 is a sectional view taken on the lines V—V in FIG. 1.

FIG. 6 is a sectional view taken on the lines VI—VI in FIG. 1.

FIG. 15 is a sectional view taken on the lines XV—XV in FIG. 13.

FIG. 16 is a sectional view taken on the lines XVI—XVI in FIG. 13.

DETAILED DESCRIPTION OF SOME PREFERRED EMBODIMENTS

Figure 1:
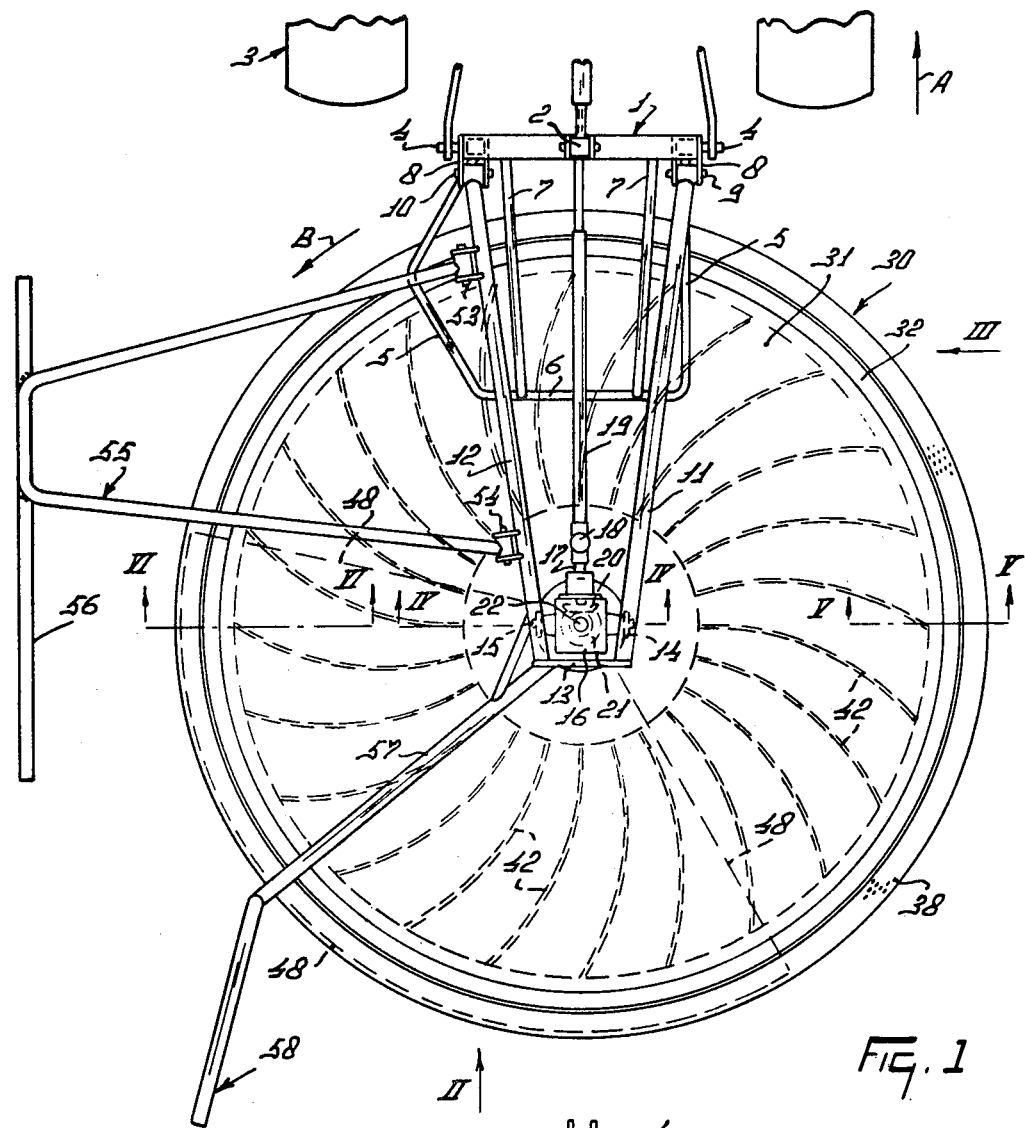
FIG. 1 is a plan view of a first embodiment of a machine in accordance with the invention.

The agricultural machine shown in FIGS. 1 to 6 comprises a frame having a trestle 1 in the shape of an inverted U and having on the top side a member 2 for fastening to the top arm of the three-point lifting device of a tractor 3 and having at the two lower ends fastening members 4 for the attachment to the two lower arms of the lifting device. Near the two lower fastening members 4, portions of trestle 1 inclined upwardly towards the center of the trestle have rigidly secured to them carrying rods 5, which extend substantially horizontally to the rear in operation from trestle 1, with respect to the intended direction of travel A. The ends of the carrying rods 5 remote from trestle 1 are coupled with one another by means of a horizontal tie beam 6 extending transversely of the direction of movement A, trestle 1 together with carrying rods 5 and tie beam 6 forming a single, rigid unit. The unit is reinforced by two lifting rods 7, located symmetrically one on each side of the vertical plane of symmetry of the trestle 1, the rods 7 being rigidly secured at the front to points of trestle 1 located one on each side of fastening member 2, whereas at the rear the rods 7 are rigidly secured to tie beam 6 at points located at a short distance from the junctions of carrying rods 5 and the tie beam 6. The two lifting rods 7 are inclined downwardly away from trestle 1 to rear. The two portions of trestle 1 inclined downwardly and upwardly from the fastening members 4 have welded to them near the two fastening members 4 tags 8 protruding rearwardly and carrying horizontal pivotal shafts 9 and 10, extending transversely of the direction of movement A, near the ends remote from the trestle 1. To pivotal shafts 9 and 10 are pivoted frame beams 11 and 12 extending in operation in a substantially horizontal direction towards the rear. With respect to the vertical plane of symmetry of trestle 1 extending in the direction of movement the two frame beams 11 and 12 are arranged to converge towards the rear, their rear ends being spaced apart from one another and being rigidly interconnected by means of a tie member 13. The beams 11 and 12 are provided at a short distance in front of the tie member 13 on the lower side with a tag 14 each. Each tag 14 holds a horizontal pivotal shaft 15, extending transversely of the direction of movement A so that the center line of pivotal shaft 15 associated with beam 11 is in line with that associated with beam 12. By means of pivotal shafts 15 a gear box 16 is pivotally fastened to beams 11 and 12.

The gear box 16 comprises an input shaft 17 extending in operation in a substantially horizontal direction towards the front. To this shaft can be connected an auxiliary shift 19 by means of a universal coupling 18, shaft 19 being adapted to be driven by tractor 3. The gear box 16 comprises a bevel gear 20 (FIG. 4), which is driven via the input shaft 17 and which is in mesh with a further bevel gear 21 mounted on a shaft 22 for rotation relative to shaft 22. The center line 23 of shaft 22 is in operation substantially vertical. Near its top end shaft 22 has a bore through which a pin 24 extends, which pin also passes through bores provided in the gear box 16 so that shaft 22 is rigidly secured against rotation with respect to the gear box 16. On the top side of gear box 16, near pin 24, shaft 22 is disposed in a comparatively long bore in the gear box 16. The gear box 16 is partly closed on its bottom side by a plate 25, which is circular viewed on plan and which has a circular opening at the center, closely engages the outer surface of the hub of the gear wheel 21. Near its outer circumference plate 25 has a circular, downwardly extending rim 26.

The gear 21, which is rotatably supported by bearings 27 and 28 about the gear shaft 22 projecting downwards out of the gear box 16, has near the bottom side a circular, outwardly and downwardly inclined flange 29. The flange 29 partly supports a rotor 30. This rotor 30 comprises a top plate 31 which lies in a first conical plane, the apex of which is located on the center line 23 and the axis of which coincides with the center line 23. The complete vertex angle of this conical plane is in this embodiment about 150°. At the outer edge concentric with the center line 23 the top plate 31 changes into a peripheral plate 32 (FIGS. 5, 6), which lies in a second conical plane, the apex of which is located on the center line 23, while the axis also coincides with said center line 23. The complete vertex angle of the second conical plane is about 75°. The vertices of the two conical planes are located above the top plate 31. The top plate 31 and the peripheral plate 32 are integral with one another. The peripheral plate 32 has a circular flange 33, to which is secured by means of bolts 34 a circular flange 35 of a screen in the form of a releasable suction wall 36. This suction wall 36 lies in a third conical plane, the whole vertex angle of which is about 75°, whereas its apex is located above rotor 30 on line 23 and axis coincides again with the line 23. The suction wall 36 is outwardly and downwardly inclined away from the flange junction 33, 35. As an alternative wall 36 may be shaped in the form of an approximately vertical cylinder or in the shape of a cone, the apex of which is located beneath the lower end of shaft 22.

The suction wall 36 is curved throughout the periphery on the bottom side inwardly toward the interior and then curved in an upward inclined direction (FIGS. 5 and 6) and from this inward curved rim which is formed it terminates in an inner wall 37, which is located between shaft 22 and suction wall 36 and which lies in a fourth conical plane having a vertex angle of about 95°, the axis being again located on the center line 23, on which its apex also is located. The latter apex is located above rotor 30. In the sectional view of FIG. 6 suction wall 36 and the inner wall 37 are disposed at an angle opening upwardly relative to one another.

The suction wall 36 has throughout its periphery a large number of suction apertures 38. The diameter of each aperture 38 is two to twenty millimeters, preferably four to ten millimeters, dependent upon the nature of the stalks to be displaced and the distance between the adjacent apertures of the same order of magnitude. The distance between adjacent apertures 38, however, is irregular. The suction wall 36 is thus perforated throughout its periphery and these perforations extend from about flange 35 to the curved portion between the suction wall 36 and the inner wall 37, this curved portion also having apertures, the center lines of which are about parallel to wall 37 and converge in centerline 23. The number of apertures per unit of surface is preferably greater near the bottom portion of wall 36 and in the curved or bent portion than in upper part of the wall 36. The wall 36 may, however, also be formed by a grating. In the embodiment illustrated, the inner wall 37 is not perforated, but it is possible to provide it with suction apertures under conditions depending upon the nature of the stalks to be displaced and upon the height of the rotor above the ground. The inner wall 37 is provided at its top and inner end with a flange 39, to which is fastened by means of bolts 40 a circular flange of a bottom plate 41. The bottom plate 41 lies in a fifth conical plane, the apex of which is again located on the center line 23, which coincides with the axis of the cone thereby formed, while the apex is located beneath the fastening area of top plate 31 to gear 21. In the sectional view of FIG. 6 the top plate 31 and the bottom plate 41 diverge towards the center line 23 at an angle of about 5°. The bottom plate 41 terminates at a distance from the center line 23, which distance is about 30% of the radius of outer circumference of the rotor 30 so that an opening is formed coaxially with the center line 23. On the bottom side of the bottom plate 41 are arranged a plurality—in this embodiment twenty-four—of blades 42 of sheet material, which are curved with respect to the direction of rotation B of rotor 30 as shown in the plan view of FIG. 1. The blades are disposed, as shown in FIG. 1, with their ends nearest shaft 22 tangential to a radial line and they bend away outwardly so that the angle between the tangential line and said radial line increases radially outwardly, while with respect to the direction of rotation B, the blade is located behind the radial line. The acute angle of interception between a line tangential to a blade 42 the radially outermost point of such blade 42 and the radial line passing through the inner end of the same blade is in this embodiment about 45° to 50°. The blades 42 terminate at their outer edge at a distance from the center line 23 approximately equal to 85% of the radius of the outer circumference of rotor 30 and also at a distance inside flange 39. The webs 43 of blades 42 are all secured on the bottom edges to a circular closing plate 44, which has an outer portion lying in a sixth conical plane, the vertex of which is located on the center line 23, while its axis coincides with the center 23; this plane is outwardly and downwardly inclined so that the outer portion of the closing plate 44 and the bottom plate 41, as shown in the sectional view of FIG. 6, diverge in the direction towards the center line 23 at an angle of about 5°. This outer portion of the closing plate 44 is joined by a central portion extending parallel to a plane at right angles to the center line 23. The circular transitional part under the opening defined by the interior edges of plate 41 between the outer portion of plate 44 and the central portion has a diameter approximately equal to that of such opening. The closing plate 44 is held by means of a bearing 45 on shaft 22 near the lower end thereof. The plates 41 and 44 and the blades 42 constitute together an air displacing means in the form of a centrifugal fan.

Between the bottom side of bearing 28 and the top side of bearing 45 shaft 22 is intimately surrounded by a sleeve 46, which has near the lower end of the shaft 22 diametrical bores through which a pin 47 extends, which pin 47 extends through a local bore in the shaft 22. The sleeve 46 is thus fixed in place relatively to shaft 22 and does not rotate in operation. The lower edge of sleeve 46 is supported by the inner ring of bearing 45, whereas the top edge of sleeve 46 engages the inner ring of bearing 28.

The stationary sleeve 46 has secured thereto an air blocking member 48 covering only a given circumferential angle about the center line 23. The blocking member 48, the periphery of which is indicated by broken lines in FIG. 1, extends through an angle of about 120°, so that as shown in the plan view of FIG. 1, viewed in the direction of movement A, the quadrant on the left-hand bottom side of rotor 30 is covered as well as an adjoining part of the quadrant on the left-hand top side and an adjoining part of the quadrant on the right-hand bottom side. As shown in the sectional view of FIGS. 4 and 6 the blocking member 48 is located between the top plate 31, the bottom plate 41, the peripheral plate 32, the foraminous suction wall 36 and the inner wall 37. The blocking plate is bounded on the top side by an upper boundary plate 49, secured to sleeve 46 and close to the inner side of top plate 31, leaving a very narrow gap, (it therefore has generally the same shape as plate 31) and on the outer side it is bounded by a peripheral plate 50 joining plate 49 and extending parallel to the rotatable peripheral plate 32 and to the foraminous suction wall 36 (a very narrow gap being left between plate 50 and the two plates 32 and 36), while on the bottom side it is bounded by an inner rim 51 integral with the peripheral plate 50 and being parallel to the inner wall 37 at a short distance therefrom and by a lowermost boundary plate 52 connected to the inner rim 51 and being integral therewith and being located a short distance above the top side of the bottom plate 41, a very narrow gap being again left between plates 52 and 41. The inner edge of the lower boundary plate 52 is secured to sleeve 46. As shown in the sectional views of FIGS. 4 and 6, the plate portions 49, 50, 51 and 52 together with sleeve 46 form a closed space. With respect to the whole space inside the top plate 31 and the bottom plate 41 of rotor 30 the space enclosed by plate portions 49, 50, 51, 52 is preferably not closed; the radially extending boundary surfaces of member 48 shown in FIG. 1 are open. Under some conditions it may be desirable for these radial boundaries of member 48 to be wholly or partly closed. If desired the narrow gap between member 48 and the bottom side of the top plate 31 as well as the narrow gap between the lower boundary plate 52 and the bottom plate 41 can be closed by flexible stuffing material.

The frame beam 12 is provided with two relatively spaced pivotal shafts 53 and 54, the center lines of which are in line with one another. A substantially U-shaped bracket 55 is freely pivotable about said pivotal shafts 53 and 54. The outer side of the U-shaped bracket 55 is located, viewed in the direction of movement A, at a distance beyond the outer circumference of the rotor 30. This outermost part of the bracket 55 is provided with a guide member 56 for the displaced stalks, which member 56 extends parallel to the intended direction of movement A and is approximately vertical during operation. As shown in FIG. 1 the prolongation of a boundary line of the blocking member 48 located in the left-hand upper quadrant of the rotor 30 intersects the guide member 56 at a place located in front of such members center, viewed in the direction of movement A.

Figure 2:
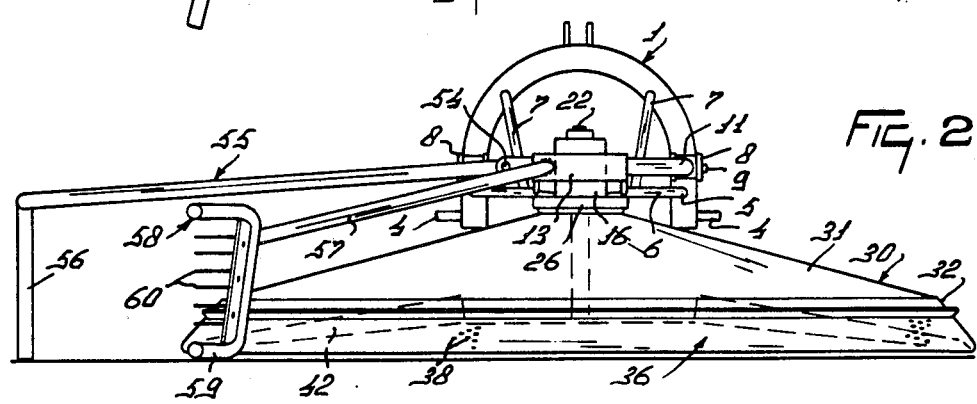
FIG. 2 shows the machine of FIG. 1 as viewed in the direction of arrow II in FIG. 1.

To the tie member 13 is rigidly secured a holder 57, which extends to the rear, viewed in the intended direction of movement A, in an inclined position and as shown in FIG. 2 towards the projected length of the guide member 56. Viewed on plan the rear end of holder 57 is located just outside rotor 30 and is fastened to a second guide member 58, which is located behind the guide member 56, viewed from a side, in an inclined position such that together with the first-mentioned guide member 56 it converges rearwardly. The two guide members 56 and 58 comprise a guide arrangement.

One of the two carrying rods 5, that is to say the rod located on the side of the guide member 56, is sharply bent outwardly towards the guide member 56, as is shown in FIG. 1, so that the lower side of the foremost limb of bracket 55 can bear on the outwardly bent portion of the carrying rod 5.

The rotor 30 can be driven by means of the auxiliary shaft 19, connected with the input shaft 17. When the input shaft 17 is driven, the bevel gear 20 and hence gear 21 are driven. Since rotor 30 is connected with flange 29 of gear 21, rotor 30 will also be rotated, whereas the blocking member 48 and sleeve 46 do not rotate. Since blades 42 together with the plates 31, 32, 36, 37 and 41 will rotate simultaneously, the blades suck in air from the space between plates 31, 32, 36, 37 and 41. The air flows away downwardly via the opening of the bottom plate 41 holding shaft 22. Thus subatmospheric pressure is produced in the space between plates 31 and 41, so that air enters through the apertures 38 provided round about in the suction wall 36 (arrow C in FIG. 5).

When the machine is moved in the direction A, the stalks and stems lying on the ground will be drawn by suction by the air flowing into apertures 38 against the outer side of the wall 36, to which they will adhere temporarily, at a suction region, i.e. the region not covered by the blocking member 48. The stalks are carried along by the preferably smooth wall 36 in the direction of the arrow B until they arrive at a non-suction region, i.e. the region where the inner side of wall 36 is screened by the blocking member 48. In this area defined by member 48, indicated by the broken lines in FIG. 1, no subatmospheric pressure is prevailing on the inner side of the wall so that no air enters through apertures 38 and the stalks adhering to wall 36 will be thrown off and be directed by the guide members 56 and 58 into a swath.

If large quantities of stalks have to be displaced per unit time, they are carried along by rotor 30 so as to say in layers. This transport of the stalks lying on the ground in layers is performed in the direction of movement of the machine. The stalks lying nearest wall 36 are drawn to said wall by the suction force and owing to the rotation of this wall they are immediately delivered so that the next stalks are attracted towards the wall portion 36 turning towards these stalks and not yet being covered with stalks. Therefore, the speed of rotation of rotor 30 is to some extent determined by the quantities of stalks to be picked up per unit time.

Since a narrow and long gap is left between the blocking member 48, which does not rotate in operation, and the rotating walls 31, 32, 36, 37 and 41, the quantity of air sucked in through apertures 38 covered by the peripheral plate 50 is very small so that no stalks or stems are attracted towards this covered wall portion.

The quantity of air sucked through apertures 38 is pushed outwardly (arrow D in FIG. 6) by the centrifugal fan formed by blades 42, the bottom plate 41 and the closing plate 44 and is discharged through the annular opening bounded by the outer edge of the closing plate 44 and the flange 39. This downwardly emerging air produces beneath rotor 30 excess pressure or an air cushion, which supports the weight of the whole rotor 30, guide members 56 and 58, the driving gear of the gear box 16 and the frame beams 11 and 12. Since rotor 30 is freely pivotable about the pivotal shaft 15, it can rise and fall to match the local conditions of the ground. In operation the frame beams 11 and 12 are freely movable above the carrying rods 5, which form a lifting device of the machine, and above the tie beam 6, which are rigidly secured to trestle 1 and hence to the lifting device of tractor 3. Thus rotor 30 is freely movable in a vertical direction and, moreover, about a transverse axis (pivotal shafts 15).

The guide member 58, which is rigidly held in place with respect to the frame beams 11 and 12, may be employed as a stabilizing member for the vertical adjustment of the rotor 30. The guide member 58 may be provided, at least on its bottom side, with a support 59, which can bear on the ground and is formed in this embodiment by a tube of circular cross-section.

The circular bottom wall of rotor 30 is located, owing to the air cushion beneath the rotor, at a distance above the ground preferably approximately at the level of the top of the stubble. The air displaced by blades 42 emerges through the gap beneath the curved plate portion between the plate portions 36 and 37 and has the effect of loosening the stalks lying among the stubbles. The stalks move towards the suction wall 36 owing to the air being drawn through the apertures 38 above the area where the air emerges from the bottom side of rotor 30, while a portion of this emerging air will practically immediately enter through apertures 38 and draw stalks against the suction wall 36. It may be desirable to prolong the guide member 58 from that part of the guide member 58 which is nearest the circumference of wall 36 and along the part of the wall circumference covered by the closing member 48 to screen the gap between the lower edge of rotor 30 and the ground in order to prevent the air flowing out beneath the rotor from adversely affecting the swath formed. For this purpose, for example, support 59 may be prolonged along that part of the lower edge of rotor 30 along which the wall 36 is screened by the blocking member 48. As shown in FIGS. 2 and 3 the guide member 58 is provided with a plurality of guide rods 60, lying one above the other and extending freely to the rear in order to form a correct swath, but as an alternative the guide member 58 may have a completely closed surface in order to prevent the air emerging from the bottom side of rotor 30 from adversely affecting the swath formed. It should be noted that rotor 30 is not tiltable about an axis parallel to the direction of movement A with respect to tractor 3 owing to the nature of the fastening structure on the lifting device of the tractor.

As stated above, rotor 30 is freely movable in a vertical direction with respect to the lifting device of the tractor, since the dimensions are chosen so that in operation the carrying rods 5 are disengaged from the frame arms 11 and 12 and are located at a distance beneath the frame arms 11 and 12. If the machine has to be lifted, the lifting device of the tractor 3 is raised until the carrying rods 5 engage the lower sides of the frame beams 11 and 12, which are thus carried along upwardly. The carrying rods 5 and the tie beam 6 constitute a lifting device associated with the machine itself, which can be actuated by the lifting device of tractor 3. The bracket 55 supporting the guide member 56 is also carried upwardly by one of the two carrying rods 5, which is bent outwardly for this purpose, for example, in making a curve on the field. During transport bracket 55 together with member 56 is tilted about the pivotal shafts 53 and 54 so that the width of the machine during transport is reduced.

Figure 7:
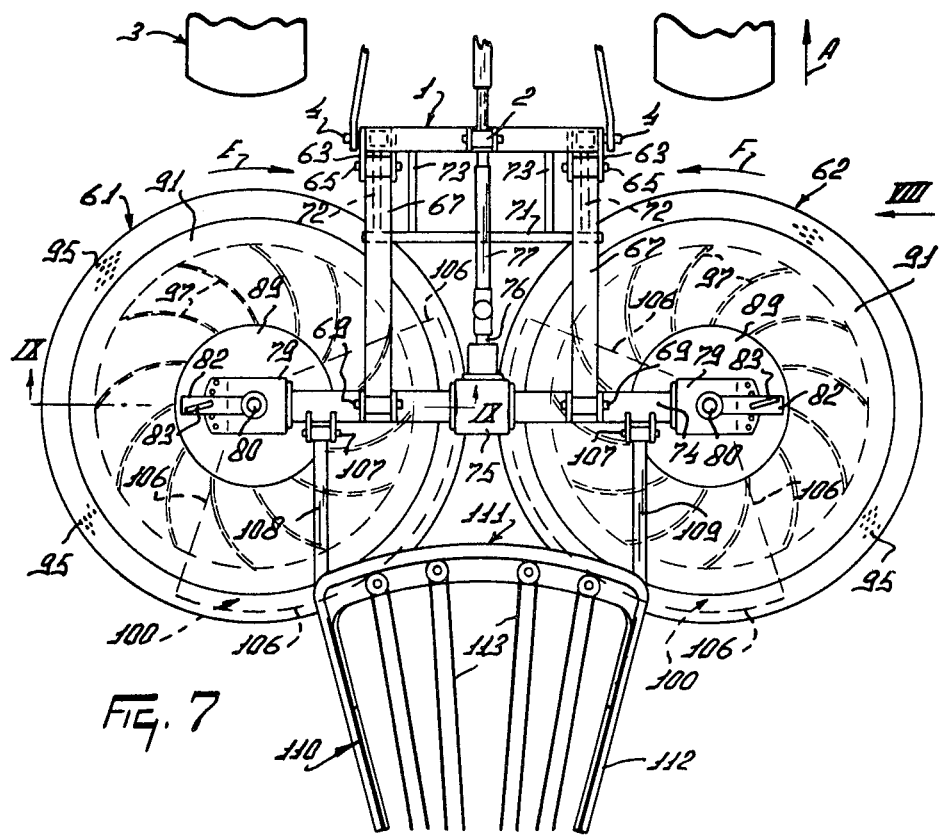
FIG. 7 is a plan view of a second embodiment of a machine in accordance with the invention.
Figure 8:
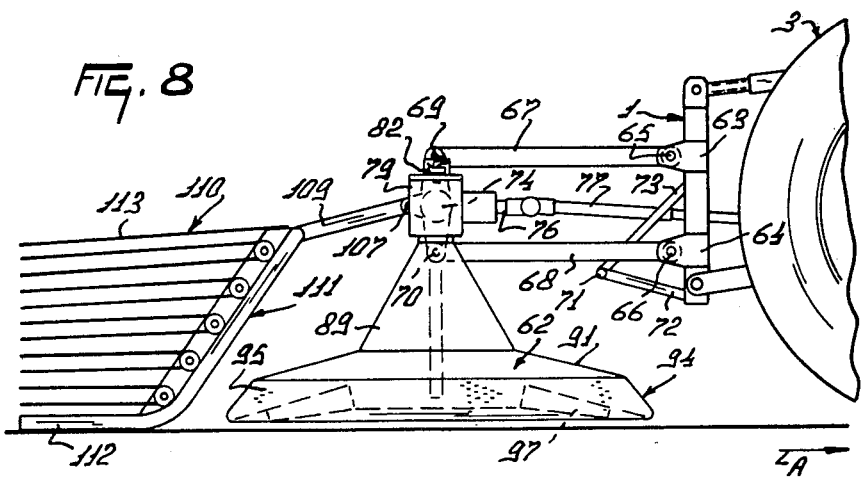
FIG. 8 is a side elevation of the machine shown in FIG. 7 as viewed in the direction of the arrow VIII in FIG. 7.
Figure 9:
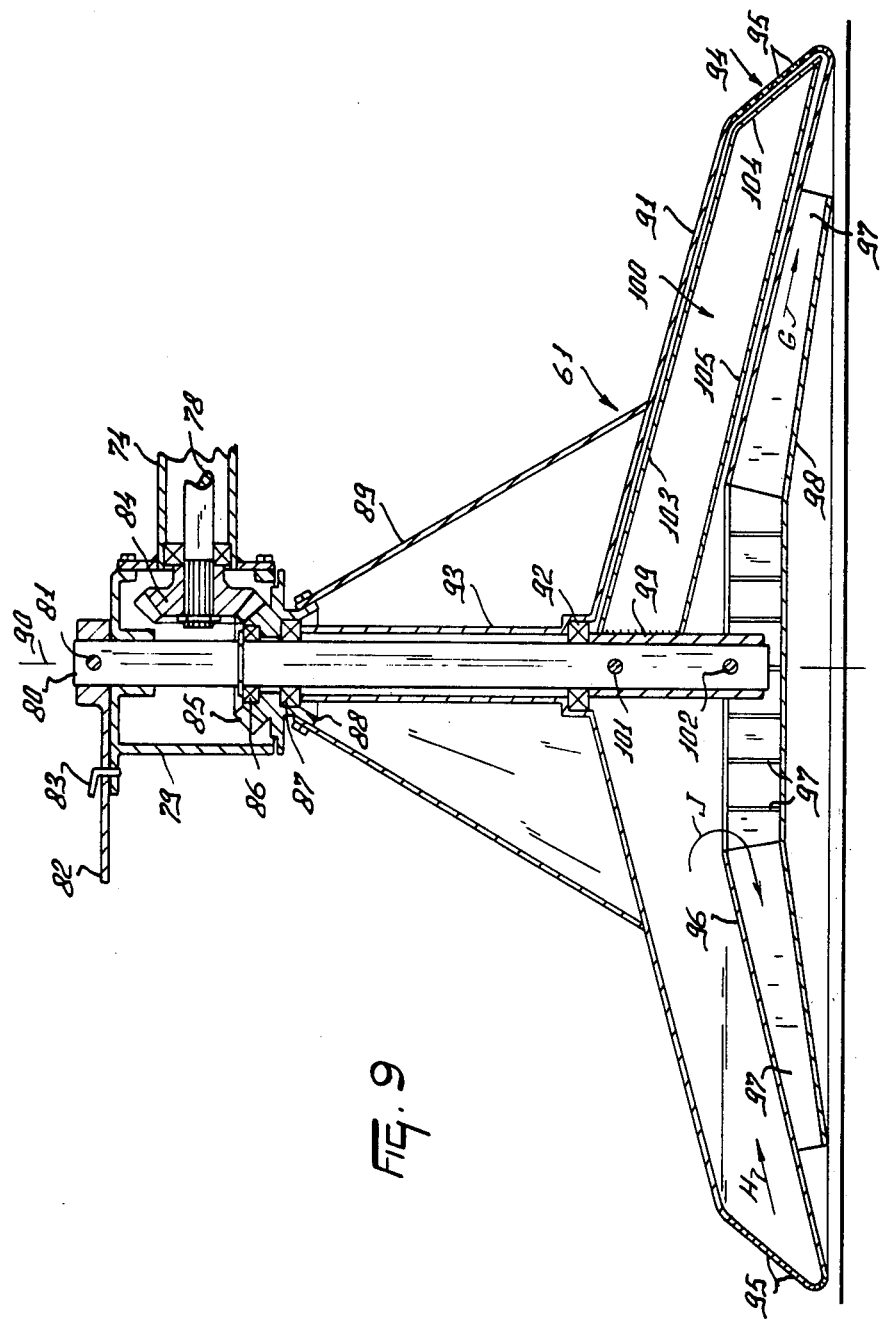
FIG. 9 is a sectional view taken on the lines IX—IX in FIG. 7.

A second embodiment of the machine in accordance with the invention is shown in FIGS. 7 to 9. This machine comprises two rotors 61 and 62, disposed side by side and adapted to rotate about upwardly extending axes in opposite senses E and F so that the adjacent sides of the rotors move to the rear. On either side trestle 1 formed in the shape of an inverted U is provided with tags 63 and 64 (FIG. 8) located at a distance one above the other. The tags 63 and 64 hold near their rear ends horizontal pivotal shafts 65 and 66 respectively, extending transversely of the intended direction of travel and having connected to them freely pivotable rods 67 and 68 respectively, which are constantly parallel to one another, since they are connected near their rear ends with horizontal pivotal shafts 69 and 70 respectively, extending transversely of the direction of movement A and being spaced apart by the same distance as the pivotal shafts 65 and 66. Viewed from a side the line of connection between the pivotal shafts 69 and 70 is parallel to the line of connection between the pivotal shafts 65 and 66 so that rods 67 and 68 afford links of a freely pivotable parallelogram linkage. Such a construction is arranged symmetrically to a vertical plane of symmetry of the machine parallel to the direction of movement. A lifting device, which again is rigidly connected to trestle 1, comprises a carrying rod 71, which is located at a distance behind trestle 1 and which extends horizontally and transversely of the direction of movement A. The width of the carrying rod 71 is such that it extends beneath the lower rods 68 at a level such that in operation rod 71 is disengaged from rods 68 and is located at a distance beneath rods 68. By means of supporting tubes 72 and 73 the carrying rod 71 is rigidly secured to trestle 1 and viewed in plan a supporting tube 72 is located beneath each of rods 68 and is inclined downwardly and forwardly from the carrying rod 71, while also viewed in plan the two supporting tubes 73 are located between rods 68 and are inclined upwardly and forwardly towards trestle 1.

The pivotal shafts 69 and 70 on the rear ends of the two pairs of rods 67 and 68 are connected with the top side and the bottom side respectively of a horizontal frame beam 74, extending transversely of the direction of movement A and supporting near its ends rotors 61 and 62. The frame beam 74 is provided at the center with a gear box 75 which is arranged symmetrically with respect to the vertical plane of symmetry of the machine in the direction of movement A, said gear box having an input shaft 76, with which can be connected an auxiliary shaft 77 to be driven by tractor 3. The rotors 61 and 62 are driven from the gear box 75 via driving shafts 78 (FIG. 9), which are located inside the hollow frame beam 74. Near each end of the frame beam 74 is a gear box 79 that supports a shaft 80, which is stationary during operation and which is then approximately vertical and emerges from the bottom side of the gear box 79. Near the top end projecting over a small distance out of the top side of the gear box 79 shaft 80 is rigidly secured by means of a pin 81 to a lever 82, by means of which shaft 80 can be turned with respect to the gear box 79, it being fixed in various positions by means of a locking pin 83.

A bevel gear 84 fastened to the driving shaft 78 and arranged inside the gear box 79 is in mesh with a bevel gear 85, which is rotatably supported by means of two bearings 86 and 87 relative to shaft 80. The bevel gear 85 is provided with a circular, downwardly extending flange 88 inclined outwardly, to which is secured a supporting element 89 of sheet material, having a surface which lies in a first conical plane, the vertex of which is located on the center line 90 of the shaft 80, while the axis coincides with said center line 90. The lower circular boundary edge of the supporting element 89, located at a distance from shaft 80, has secured thereto a circular top plate 91, the surface of which lies in a second conical plane having its vertex located on the center line 90 and its axis coinciding with said center line. The vertex of the second conical plane is located above the material of the top plate 91. The top plate 91 extends inside the supporting element 89 (to near the shaft 80) and outside the lower boundary edge of the supporting element 89. The sectional view of FIG. 9 shows that the supporting element 89 is fastened to the top plate 91 approximately midway across the surface thereof. At shaft 80 the top plate 91 is fastened to the outer ring of a bearing 92, which is located near the vertex of the conical plane of plate 91, which is thus allowed to rotate relatively to shaft 80. The plate 91 is furthermore connected with a sleeve 93 extending between the lower side of bearing 87 and the top side of bearing 92 and being coaxial with shaft 80. Near its outer periphery the top plate 91 changes in a downwardly bent circular suction wall 94 affording a screen, the surface of which lies in a third conical plane, the vertex of which is located on the center line 90 and the axis of which coincides with said center line 90. The shape of the conical plate 91 and wall 94 is approximately equal to that of the corresponding parts in the first embodiment. Throughout its height and its circumference the suction wall 94 is perforated by a large number of apertures 95, which are also made in an inward curved portion terminating in a circular bottom plate 96, the surface of which is approximately parallel to that of the top plate 91. The bottom plate 96 terminates at a distance from the shaft 80 so that the inner boundary edge of the conical plate 96 leaves an opening around shaft 80, the diameter of which is about 30% of the outer diameter of rotor 61 itself. On the bottom side of the plate 96 a large number of blades 97 are provided, the shape of which is similar to that of blades 42 of the first embodiment with respect to the center line 90 and to the direction or rotation E and F respectively. The passages between blades 97 are closed on the bottom side by a closing plate 98, an outer portion of which is conical so that the upper and lower boundaries of the space between said portion of the closing plate 98 and the bottom plate 96 converge outwardly. The sectional view of FIG. 9 shows that the outer portion of the closing plate 98 and the bottom plate 96 are at an angle of about 5° to one another. The central portion of the closing plate 98 is at right angles to the center line 90, passes beneath the lower end of shaft 80 and closes rotor 60 at the center. The outer edge of the closing plate 98 is at a distance from the center line 90 approximately equal to 75% of the outer circumference of rotor 61 or rotor 62 respectively.

The lower side of the inner ring of the bearing 92 is in contact with a sleeve 99, which intimately surrounds the lower end of shaft 80 and which has an air blocking member 100 rigidly secured to it. The member 100 and sleeve 99 are firmly secured to shaft 80. The blocking member 100 comprises an upper closing plate 103 spaced with a very small clearance from the lower side of the top plate 91, the outer edge terminating in a non-perforated peripheral plate 104, which is spaced from the inner side of the perforated suction wall 94 with a small clearance. The lower and outer edge of the peripheral plate 104 joins a lower boundary plate 105, which is spaced from the top side of the bottom plate 96 with a small clearance. The plates 103, 104 and 105 cover only part of the circumference of the rotor and are bounded, viewed on plan, by the broken lines 106 in FIG. 7. The inner edges of the boundary plates 103 and 105 are secured to sleeve 99. The radial boundary surfaces of the blocking members 100 designated in FIG. 7 by reference numeral 106 need not be closed; they may as an alternative be wholly or partly closed (near the suction wall 94). The blocking members 100 of rotors 61 and 62 extend, as is shown in FIG. 7, inside the parts of the rotors which face one another and partly across the rear sides of the rotors.

Near the two gear boxes 79 the frame beam 74 is provided with aligned pivotal shafts 107, to which rearwardly extending supports 108 and 109 are fastened so as to be freely pivotable. The rear ends of supports 108 and 109 are provided with a swath basket 110, which bears on the ground during operation and which has an entrance with a width which is approximately equal to 75% of the diameter of one of the rotors. The swath basket is disposed symmetrically with respect to the vertical plane of symmetry parallel to the direction of movement A. Viewed on plan the smallest distance between the adjacent edges of rotors 61 and 62 is approximately equal to 5% to 15% of the diameter of one of the rotors, preferably about 10% of said diameter. The swath basket 110 comprises a bracket 111 limiting the entrance on the sides and on the top and terminating on the bottom side in sliding rods 112 (FIG. 8), bearing on the ground during operation. The bracket 111 is provided with guide rods 113 extending freely to the rear, which smooth the swath formed during the movement of the machine.

In operation each of the two specularly identical rotors 61 and 62 is driven via the auxiliary shaft 77, the gear box 75, the driving shaft 78, the bevel gears 84 and 85 and the supporting element 89. The sleeve 93, which is rigidly secured to the top plate 91, will also rotate during operation. The air displacing means of each of the rotors, formed by the bottom plate 96 fastened to plates 91 and 94, blades 97 and the closing plate 98, acts as a centrifugal fan to displace the air outwardly in the direction of the arrow G in FIG. 9. This air is sucked in through the opening bounded by the inner edge of the bottom plate 96 and it enters through apertures 95 in the suction region of the suction wall 94 into the space bounded by plates 91, 95 and 96, in which space subatmospheric pressure is produced by the air displacer. This air travels in the direction of the arrows H, J and G in FIG. 9. During the movement of the machine in the direction A the crop lying on the ground and encountered by the front sides of the suction walls 94 of the two rotors 61 and 62 is attracted by suction to the outer sides of said suction walls 94, the stalks being carried by walls 94 in the direction of rotation E and F respectively towards the region between the two rotors 61 and 62. At the non-suction region between the two rotors the subatmospheric pressure prevailing inside the suction walls 94 disappears because the peripheral plate 104 of the blocking member 100 of the relevent rotor appears behind the rear side of the rotating suction wall 94 so that the stalks adhering to wall 94 are ejected away from said wall and thus arrive into the swath basket 110.

The air displaced by the blades 97 generates excess pressure beneath each of the two rotors, so that the rotors and the associated frame parts and driving gear can be supported by said air. The displaced air emerges through the gap formed between the outer and lower edges of the rotors and the ground, while the stalks loosened by this emerging air are attracted to the suction wall 94 above said emerging air layer.

The orientation of the area over which the blocking members 100 cover the suction wall 94 of the associated rotor can be adjusted by loosening the locking pin 83 and by turning lever 82 about the center line 90 until the desired orientation is reached, after which the locking pin is re-inserted. In this manner the place of release of the crop from the rotors can be adjusted to suit the nature of the stalks. The blocking members 100 can be turned in the directions E and F respectively to an extent such that the crop is tedded, i.e. is spread over a large width. During this tedding operation the swath basket 110 is put out of operation by turning it upwards about the pivotal shafts 107. Also the first embodiment may be employed in this manner.

The two rotors are in common movable with respect to the lifting device of tractor 3 in a manner such that the center lines 90 of the two rotors constantly remain parallel to themselves and vertical owing to the attachment by means of the parallelogram linkage, the corners of which are formed by the pivotal shafts 65, 66, 69 and 70. The rotors bearing on the air cushion can, therefore, freely match the conditions of the ground, the swath basket 110, however, bearing constantly on the ground. It will be obvious that instead of the swath basket 110 two guide walls secured to the supports 108 and 109 respectively may be employed, which are separately movable with respect to one another and to the frame beam 74 in a vertical direction.

Owing to the attachment to the lifting device of the tractor by means of the two parallelogram linkage the rotors cannot tilt with respect to the tractor about a horizontal axis parallel to the direction of movement A.

If during operation the machine is to be lifted, trestle 1 is elevated so that the carrying rod 71 forming a lifting member will engage the lower side of the two lower rods 68, the two rotors being then lifted from the ground, the center lines 90 remaining, however, parallel to one another and substantially vertical.

Figure 10:
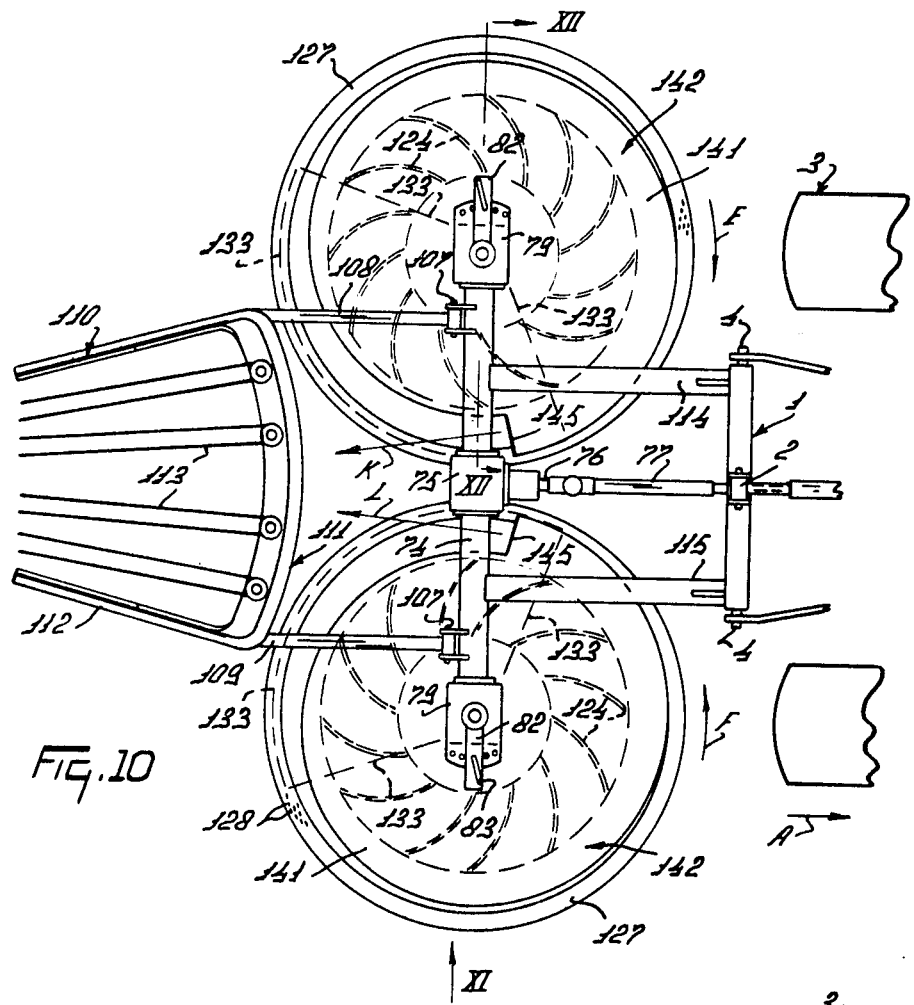
FIG. 10 is a plan of a third embodiment of a machine in accordance with the invention.
Figure 11:
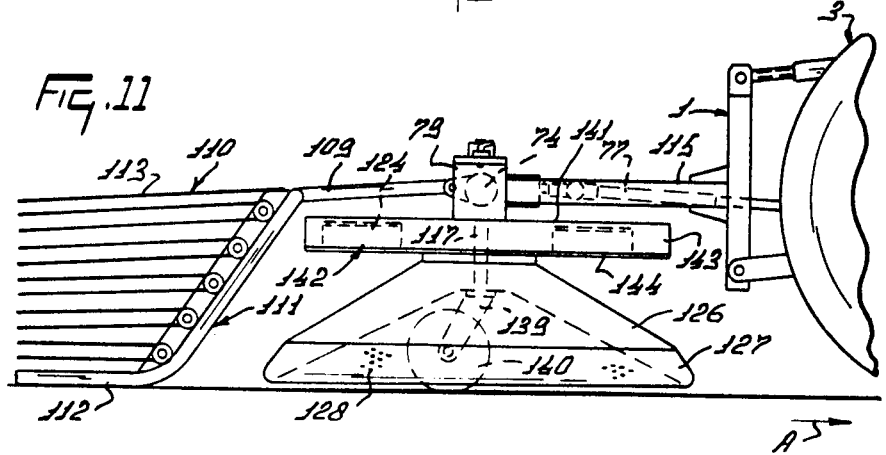
FIG. 11 is a side elevation of the machine shown in FIG. 10 viewed in the direction of the arrow XI in FIG. 10.
Figure 12:
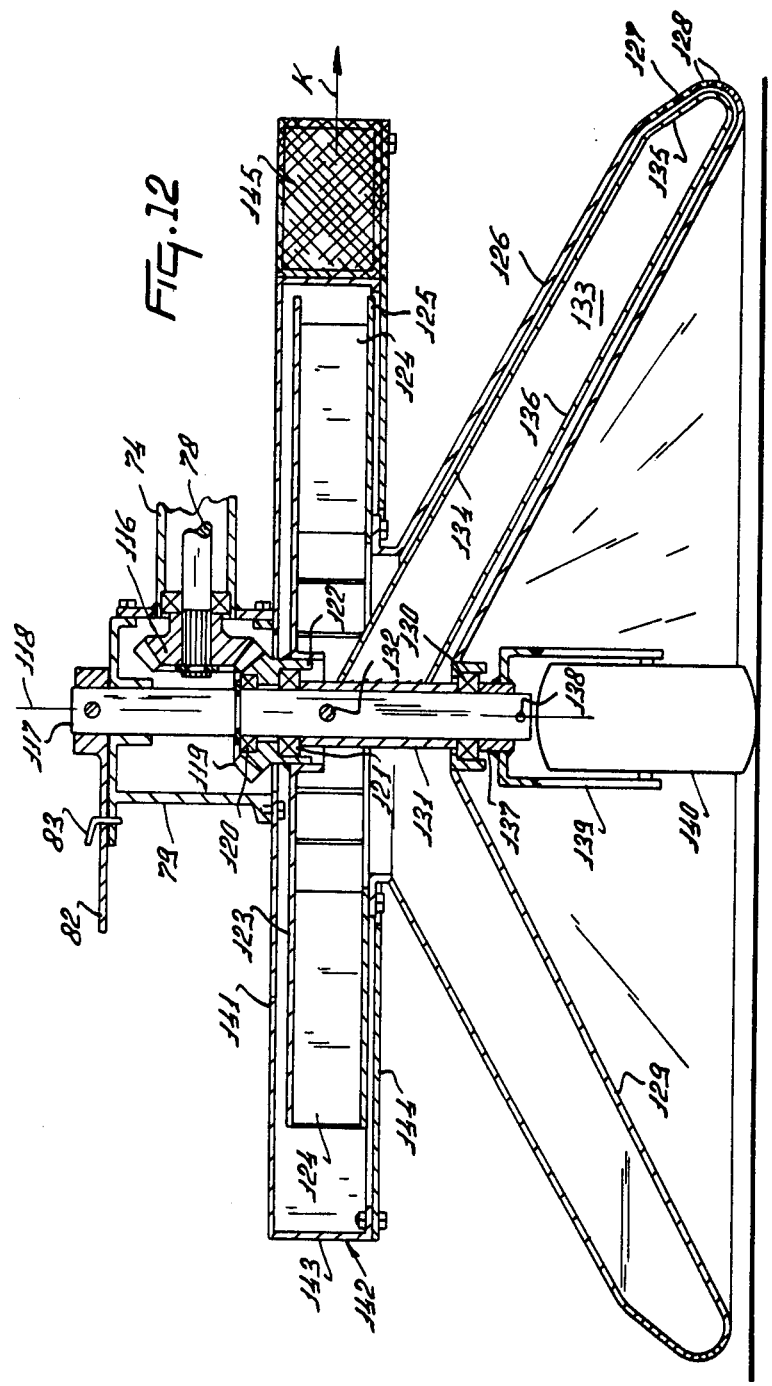
FIG. 12 is a sectional view taken on the lines XII—XII in FIG. 10.

In a third embodiment (FIGS. 10 to 12) two rearwardly extending frame beams 114 and 115 are rigidly secured to the rear side of trestle 1. The rear ends of the beams 114 and 115 are rigidly secured to the horizontal frame beam 74, extending transversely of the direction of movement A and being provided at the center with a gear box 75, having an input shaft 76 driven via an auxiliary shaft 77. Component parts corresponding in place and function with those of the preceding embodiment are designated by the same reference numerals. The driving shaft 78 (FIG. 12) is provided at its end located inside the gear box 79 with a bevel gear 116. In the gear box 79 is fastened a shaft 117, which does not rotate in operation and the center line of which is designated by 118. The gear 116 is in mesh with a further bevel gear 119, which is rotatable about shaft 117 by means of two bearings 120 and 121 spaced apart in upward direction. A downwardly extending, circular flange 122 of gear wheel 119 is provided with an annular top plate 123, which is coaxial with the center line 118 and which is parallel to a plane at right angles to the center line 118. The lower side of the top plate 123 is provided with a great number of blades 124, the shape of which, viewed on plan, is identical to that of blades 42 and 97 of the preceding embodiments. The blades 124 also terminate at a distance from shaft 117 so that centrally of the blade assembly a flow opening is left for the air around shaft 117. The blades 124 are supported on their bottom edges by a bottom plate 125, which has an annular shape and has the same outer diameter as the top plate 123 and an opening at the center equal in size to the aforesaid air flow opening. Near the inner edge the bottom plate 125 has fastened thereto a downwardly extending upper rotor plate 126, the surface of which lies in a first conical plane having its vertex located on the center line 118 and its axis coinciding with said center line. The imaginary vertex of the cone formed by the outer surface of the plate 126 is approximately located at the level of the bearing 121. The vertex of the cone defines an angle which is about 120°. The rotor plate 126 is inclined downwardly and outwardly away from the inner wall of the bottom plate 125 and changes near its lower edge in a downward direction into a circular peripheral plate portion 127 having a large number of apertures 128 throughout the height and the circumference, the size and the intervals of said apertures being identical to those of the first embodiment. The peripheral plate portion 127 has a conical surface, the vertex of the cone being again located on the center line 118, while the axis coincides with said center line 118. The vertex defines an angle which is about 70°. The lower edge of plate 127 is bent inwardly throughout the circumference and terminates in a lower rotor plate 129 located at a distance beneath plate 126, to which it is about parallel, the space left between the two plates 126 and 129 slightly converging towards its circumference. The inwardly bent lower portion of the peripheral plate portion 127 also has apertures 128 up to its transition to plate 129. The inner edge of plate 129 is fastened near shaft 117 to the outer ring of a bearing 130. Between the lower side of the inner ring of bearing 121 and the top side of the inner ring of bearing 130 a sleeve 131 closely surrounds shaft 117 and is rigidly secured to shaft 117 by means of a pin 132 passed diametrically through shaft 117. The sleeve 131 has firmly secured thereto an air blocking member 133 having an upper boundary plate 134, which is spaced with a small clearance from the inner side side of plate 126. The plate 134 changes into a peripheral portion 135, which is parallel to the peripheral plate portion 127 at a small distance therefrom and which has on the lower side an inwardly curved transitional portion engaging a lower boundary plate 136, which is located at a very small distance above the top surface of the lower rotor plate 129, the inner edge being secured to the sleeve 131. Viewed on plan (FIG. 10) the boundary lines of the blocking member 133 are indicated by broken lines bearing the same reference numeral. The radial boundary surfaces of member 133 may be open or wholly or partly closed as in the preceding embodiment.

A sleeve 137 is freely rotatable about the portion of shaft 117 located beneath bearing 130, sleeve 137 being supported by a pin 138 passed diametrically through shaft 117. On either side of sleeve 137 wheel carriers 139 are symmetrically arranged, in which a ground wheel 140 is rotatably journalled. Viewed in the direction of movement A in operation the wheel carriers 139 extend rearwardly (FIG. 1), since the ground wheel 140 is a caster wheel. The ground wheel 140 is located at least mainly beneath the hindmost half of the associated rotor. The lower side of the gear box 79 has secured thereto a top plate 141 of a pump shell 142 surrounding an air displacing means in the form of a centrifugal fan 123, 124, 125. The top plate 141 is provided at its outer edge, which is not coaxial with the center line 118, with a sidewall 143 extending parallel to the center line 118, the lower side of sidewall 143 has fastened to it a bottom plate 144, which is located at least with a slight amount of clearance beneath the lower plate 125 of fan 123, 124, 125, while an inner boundary edge, which is circular and coaxial with the line 118 is located at a short distance from the fastening area of the upper rotor plate 126 to the lower plate 125. Viewed in a direction of the relatively opposite rotary senses E and F of the two rotors the cross-section of the pump shell 142 between walls 141, 143, 144 and the outer boundaries of blades 124 progressively widens from a point located beneath the frame beam 74 in the directions of rotation E and F up to a delivery opening 145, where said cross-section has its greatest value. The air displaced by the fan is discharged in the directions K and L respectively (FIG. 10) to the rear, said directions converging to the rear. The delivery openings 145 are located adjacent the vertical longitudinal plane of symmetry of the macine between the rotors and parallel to the direction of movement A.

In a vertical direction the delivery openings 145 are located so that the emerging air is blown out towards the swath basket 110 or between two separate guide walls for the crop.

In operation fan 123, 124, 125 is driven via the driving shaft 78 and gears 116 and 119 so that the members displacing the stalks comprising plates 126, 127 and 129 are caused to rotate, since the upper rotor plate 126 is rigidly secured to the air displacer. The air sucked in by the air displacer 123, 124, 125 through the central opening of plate 125 produces subatmospheric pressure in the housing of the rotor so that air is sucked in through apertures 128 at the suction region. Contrary to the preceding embodiments the air displacer is arranged here above the rotor proper. If the machine is moved in the direction A, the stalks located on the ground in front of the foremost portions of the two rotors are sucked towards the perforated peripheral plate 127 and carried in the directions of rotation E and F respectively inwardly between the two rotors. Like in the preceding embodiments the crop is carried in layers, since the stalks attracted towards the peripheral plates 127 are immediately displaced in the direction of rotation of the rotors and new openings not covered with stalks become available for attracting new stalks (these attractions of stalks in layers occur in the direction of movement A). Since the transitional portion between the peripheral plate 127 and the lower rotor plate 129 is also perforated, stalks lying among the stubbles are loosened and picked up. The stalks displaced in the directions E and F get between the two rotors into a non-suction region where the rear side of the stalk-carrying portion of the peripheral plate 127 is covered by the corresponding air blocking member 133 so that the stalks are released and travel in a relative sense towards the swath basket 110. Since the blocking member 133 covers a comparatively large circumferential angle of the associated rotor, it is always ensured that the stalks are released at places from where the crop can be thrown into the swath basket 110. By turning the blocking member 133 farther in the directions E and F respectively by means of the adjusting member 82, 83 the crop can be tedded, when the swath basket 110 is put out of operation by turning the shafts 107 upwardly. The air displaced by the air displacer is collected on the inner side of sidewall 143 of the pump shell 142 and is pushed in the directions E and F through a flaring cross-section and the delivery openings 145 in the directions K and L, said air stream contributing to densification of the stalks thrown into the swath basket 110, which preferably has rearwardly converging boundary walls. As a matter of course, as an alternative the ground wheel 140 may be adjustable in a vertical direction and fixable in a plurality of positions so that the height of the lower edge of the peripheral plate 127 above the ground can be adapted to the nature of the crop to be picked up.

Despite the rigid connection of the frame beams 114 and 115 the machine can move freely up and down with trestle 1, when the lifting device of tractor 3 is released, while the swath basket 110 or two separately movable guide walls can freely match the unevennesses.

Figure 13:
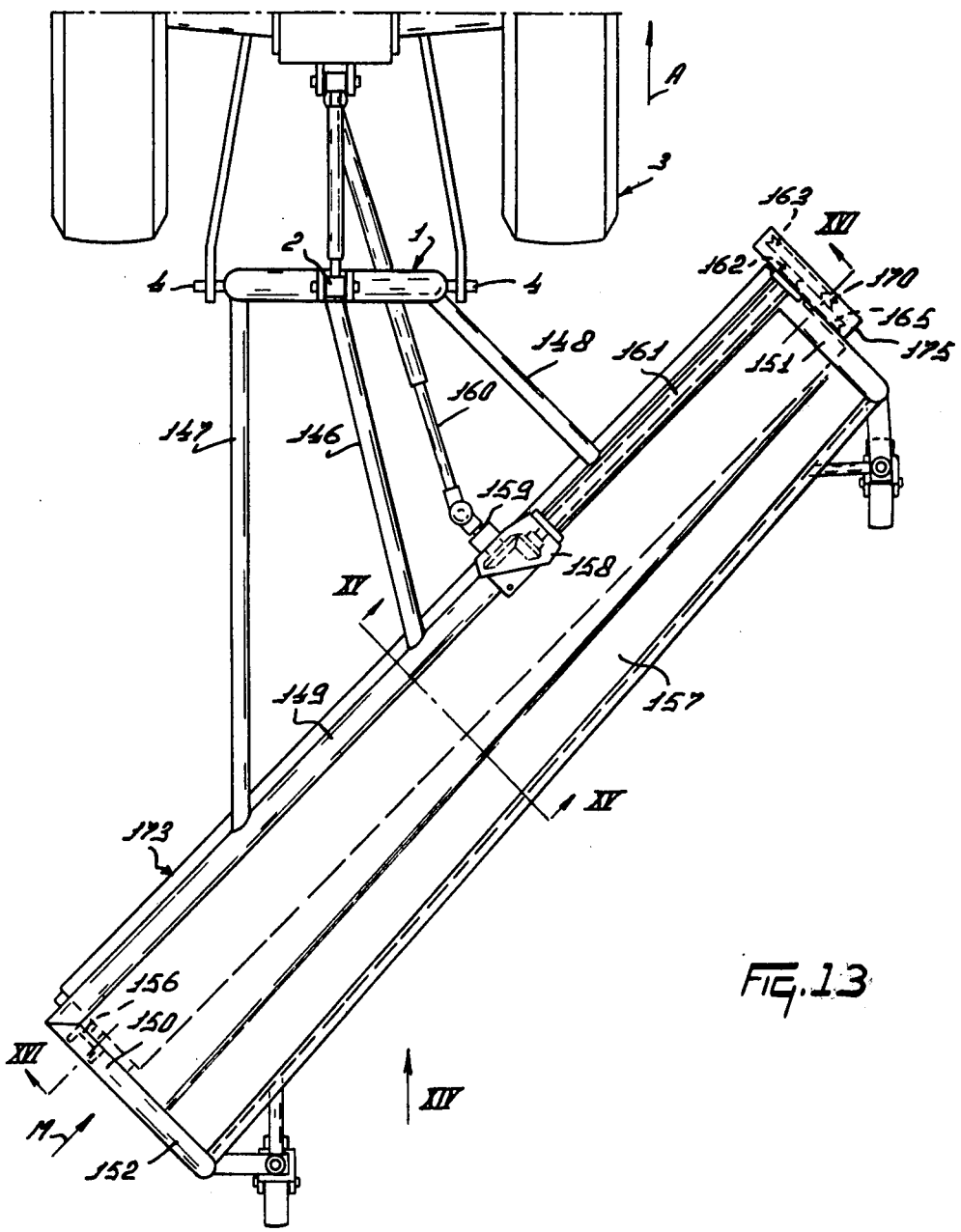
FIG. 13 is a plan view of a fourth embodiment of a machine in accordance with the invention.
Figure 14:
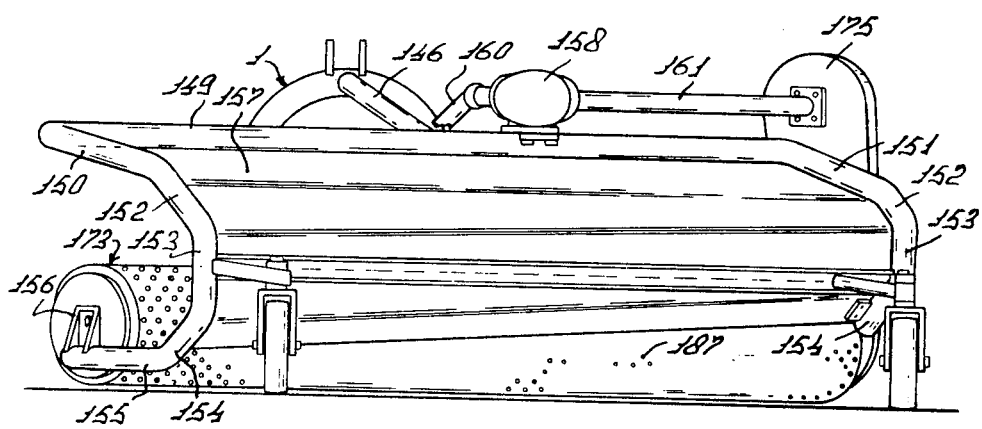
FIG. 14 is a rear view of the machine shown in FIG. 13 taken in the direction of the arrow XIV in FIG. 13.

In a further embodiment trestle 1 is provided with three supporting rods, a supporting rod 146 being secured near the fastening member 2 to the top side of trestle 1 and being inclined downwardly and laterally to the rear (FIG. 13), a supporting rod 147 being inclined, near one of the lower ends of trestle 1, to the rear and in upward direction and a third supporting rod 148 being inclined, near the other end of trestle 1, to one side and in upward direction. These supporting rods 146 to 148 are disposed so that their ends can be secured to a frame beam 149, which is at an angle of about 45° to the direction of movement A as shown in the plan view of FIG. 13. The frame beam 149 is provided at both ends with laterally and rearwardly inclined side beams 150 and 151 respectively, which join at their rear ends downwardly bent beam portions 152, adjoining approximately vertical beam portions 153, adjoining forwardly and downwardly inclined frame portions 154 and adjoining forwardly inclined, horizontal end portions 155. The assembly of beam portions 150, 152, 153, 154 and 155 and the assembly of the corresponding beam portions 151, 152, 153, 154 and 155 at the other end of the frame beam 140 are located, viewed on plan, parallel to a vertical plane at an angle of about 45° to the direction of movement A (FIG. 13). The end portion 155, located farthest to the rear of the machine, is provided near its end with a bearing support 156 (FIG. 14). A sharply bent plate construction 157 extending the entire length of the machine and having a shape corresponding with that of beams 150 to 155 is arranged between the frame beam 149 and the two opposite side beam portions 150 and 151 and between the beam portions 152, 153 and 154, fastened to the two ends of beam 149. The top side of the frame beam 149 is provided with a gear box 158 having a input shaft 159, with which can be connected an drive shaft 160 to be driven by the tractor. An output shaft of said gear box 158 is coupled by means of a driving shaft held in a tube 161 extending parallel to the beam 149 with two pulleys 162 and 163 located side by side and adapted to rotate about the same axis. A driving belt 164 passes around the pulley 162 is also passed around a pulley 165, which is adapted to rotate about a bearing 166, which is held in a support 167. The support 167 is rigidly secured to a supporting plate 168 arranged between the side beams 151 and 155 near the foremost end of the machine, viewed in the direction of movement A. The plate 168 also engages the beam portions 152, 153, 154 and 155 joining the side beam 151. A driving belt 169 is passes around the larger pulley 163 located at the side of and obliquely in front of the pulley 162. The driving belt 169 is passed on the bottom side around a pulley 170, which is rigidly secured by means of a series of inner key ways to a horizontal shaft 171, which is viewed in plan approximately parallel to the direction of length of the frame beam 149. The pulley 170 is journalled by means of a bearing 171A in support 167, which also holds pulley 165. The pulley 165 is provided with a closed end partition 172, which has an annular shape and is coaxial with pulley 165. To the periphery of the end partition 172 is secured a hollow cylinder 173, which is coaxial with the outer periphery of bearing 166. The comparatively long cylinder 173 extends in a direction of length approximately parallel to the direction of length of beam 149 and covers substantially the whole distance between the side beams 150 and 151. The center line of cylinder 173 is designated by reference numeral 174 in FIG. 15. The construction of the pulley drive at the front end of the machine, surrounded by a screening casing 175 is such that the center line of shaft 171 extending parallel to the center line 174 is located, viewed in the direction of the arrow M (FIG. 13) and with respect to the direction of movement A obliquely behind and beneath the center line 174 (FIG. 15). Near the support 167 shaft 171 is provided with a closed end partition 176, which is coaxial with the center line of shaft 171. At the end remote from the screening casing 175 cylinder 173 is held by a closed end partition 177, which has an annular shape and has its inner edge secured to a hub 178, which is rotatable by means of a bearing 179 about a support 180, which is fastened by means of bolts 181 to the bearing support 156.

Near the support 180 shaft 171 is provided with a second end partition 182 of the same size as the end partition 176 located near the other end of shaft 171. Between the end partitions 176 and 182 are arranged a great number of curved blades 183, for example twenty-four blades, of a size such that the boundary lines facing shaft 171 define a space around shaft 171, the diameter of which spae is about 60 to 70% of the diameter of the space defined by outer boundary lines of the blades 183 parallel to shaft 171. The location of shaft 171 with respect to the center line 174 of cylinder 173 and the largest diameter of the air displacing means formed by blades 183 are chosen so that, viewed in the direction of the arrow M, the outer periphery of the air displacing means formed by blades 183 nearly touches the inner wall of cylinder 173 at a place in line with the line of connection between the center line 174 and the center line of shaft 171 (FIG. 15).

The shaft 171 is supported by means of a bearing 184 on the same support 180 as that holding cylinder 173.

The portion of the plate construction 157 located between the two end portions 155 is provided near the outer circumference of the cylinder with a connecting piece 185 extending the entire length of cylinder 173, the boundary edge facing the cylinder engaging cylinder 173 with a very slight amount of clearance, while said end is oriented opposite the direction of rotation N of the cylinder 173 and serves as a scraper. A closed blocking plate 186 is arranged between the inner side of cylinder 173 and the outer circumference of the air displacing means formed by blades 183. The blocking plate 186 is arranged in the region located, as shown in FIG. 15, with respect to the direction of movement A, on either side of the forwardly prolonged line of connection between the center line 174 and the center line of the shaft 171. The blocking plate 186 has a curved shape as shown in FIG. 15. The lowerside of said plate engages the outer circumference of the air displacing means, whereas the top side of said plate nearly touches the inner side of cylinder 173. The plate 186 also covers the whole axial length of the cylinder 173.

The cylinder 173 has perforations in the form of apertures 187 throughout its circumference and its length and thus affords an air-permeable screen. The diameters and the intervals between the apertures 187 correspond with those of the peripheral plates in the preceding embodiments.

The plate construction 157 is shaped so that the portions located between the frame portions 154 at the ends of the machine and between the end portions 155 extend in the direction of length of cylinder 173 and are inclined downwardly and rearwardly, viewed in the direction of movement, as is shown in FIG. 14. For this purpose the beam portions 152 and 153 located at the front of the machine are shorter than the beam portions 152 and 153 at the rear of the machine. A portion 188 (FIG. 15) of the plate construction 157 is thus inclined downwardly and rearwardly, viewed in a direction parallel to shaft 171. The further portions of the plate construction 157 are shaped so that with respect to the center line 174 of the cylinder 173 and viewed parallel to said center line 174 said portions diverge to the rear as will be apparent from FIGS. 13 and 15.

In operation both cylinder 173 and the air displacing means comprising blades 183 are driven in the direction N. Through the auxiliary shaft 160, the input shaft 159, the gears of the gear box 158 and the driving shaft located in tube 161, pulleys 162 and 163 are driven and hence via belts 164 and 169 pulleys 165 and 170 respectively are also driven, which in turn drive cylinder 173 and the air displacing means formed by blades 183.

Since the effective diameter of pulley 162 is small as compared to that of pulley 163 and pulley 175 has a larger effective diameter than pulley 170 the air displacing means is driven with a higher rotational speed than cylinder 173. The speed of rotation of cylinder 173 in operation is about 300 rev/min, whereas the impeller forming the air displacing means is driven with a speed of about 2000 rev/min. It is desirable to have a ratio of about one to seven between the speeds of rotation of the cylinder and the air displacing means.

In operation the air displacing means sucks air out of the space between inner side of the cylinder 173 and the outer side of the impeller in a section region defined by the front side of the blocking plate 186. This air is blown out by the blades into the space between the inner side of cylinder 173 and the outer side of the blades in a non-suction region located behind the blocking plate 186, viewed in the direction of movement A. In this way subatmospheric pressure is created in the suction region at the front of the blocking plate 186 so that air is sucked in through apertures 187 on the front and bottom sides of cylinder 173. The air is blown out through apertures 187 located in the non-suction region behind blocking plate 186. When the machine moves forwards in the direction A stalks lying on the ground are attracted by suction against the outer side of the cylinder and carried in the direction of rotation N to a point located behind the rear side of the blocking plate 186, where the stalks are blown off the cylinder by the air emerging through apertures 187. The stalks blown off are discharged in the gutter-like space formed by the plate construction 157, the stalks dropping on the plate portion 188, which is laterally and rearwardly inclined, so that the stalks are passed to the rear end of the machine, where they are deposited in a swath. Since the blades are located on the rear and bottom sides at a very small distance from inner surface of the cylinder 173 and will rotate near the front side with a very slight amount of clearance along the bottom side of the blocking plate 186, whereas the top side of the blocking plate 186 is located very near the inner side of cylinder 173, direct air flows between the subatmospheric pressure region and the excess pressure region are avoided. Stalks carried on by the cylinder 173 to an excessive extent are scraped off cylinder wall by the connecting piece 185.

Figure 17:
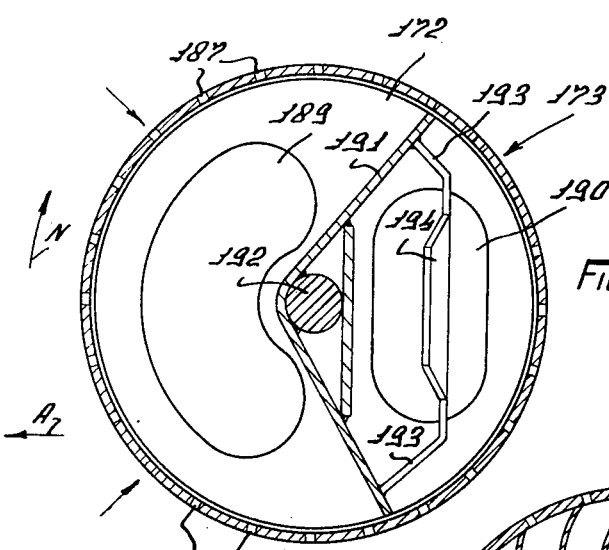
FIG. 17 shows a first modification of the construction shown in the sectional view of FIG. 15.

FIG. 17 shows in a general fashion a further possibility of combining cylinder 173 with suction and discharge abilities. The end partition 172 located near the front end of cylinder 173 has two openings 189 and 190 lying one behind the other in the direction of movement A and occupying a large portion of partition 172. The other end partition 177 is closed. Between the two openings 189 and 190 is arranged a V-shaped separating partition 191, which is fastened to a shaft 192 extending over the whole length of the cylinder. The shaft 192 is a non-rotatable shaft, which is secured to supports 167 and 180. The V-shaped separating partition 191, the shape and disposition of which are shown in FIG. 17, is orientated to the front by its tip fastened to shaft 192, the sides of the V being symmetrical to a horizontal plane going through the center line of shaft 192. The ends of partition 191 are located at a very small distance from the inner side of the cylinder 173. By means of brackets 193 the partition 191 is provided on its rear side with an air distributing plate 194, which is located approximately centrally in front of the inlet opening 190, as is shown in the axial view of FIG. 17. Viewed parallel to shaft 192 plate 194 covers part of the length of cylinder 173, for example, one-half the length thereof. Contrary to the embodiment shown in FIG. 15, the end partition 172 fastened to support 167 is stationary, whereas cylinder 173 is connected by means of supports (not shown) with pulley 165. In this embodiment only cylinder 173 is rotating.

Outside cylinder 173 at the place where the screening casing 175 of the preceding embodiment is shown a fan (not shown) is provided so that its intake opening communicates with opening 189 and the discharge opening communicates with opening 190. Viewed in the direction of movement A, a suction region at the front part of cylinder 173 and in front of the separating partition 191 the fan produces subatmospheric pressure so that air will flow in through apertures 187. This air, which is pushed by the fan through the inlet opening 190 in the part of cylinder 173 which is located behind partition 191, is blown out through apertures 187 in a non-suction region at the rear part of cylinder 173. The air distributing plate 194 ensures that the air is blown out near the end partition 172 through apertures 187 and also near the end of the cylinder 173 located near end partition 177. If desired, a fan may be disposed at both ends of cylinder 173.

In operation the front and bottom sides of the cylinder 173, moving at a small height above the ground, encounter stalks lying on the ground, which are attracted to the outer side of the cylinder by the air sucked in through apertures 187. The stalks are carried in the direction of rotation N. The suction force exerted on the stalks is maintained as far as beyond the top end of partition 191, after which the stalks enter the nonsuction region where air is blown out through apertures 187 so that the stalks are released in the region behind partition 191 and drop into the diverging, downwardly inclined gutter, parts of which are formed by the plate portions 185 and 188.

Figure 18:
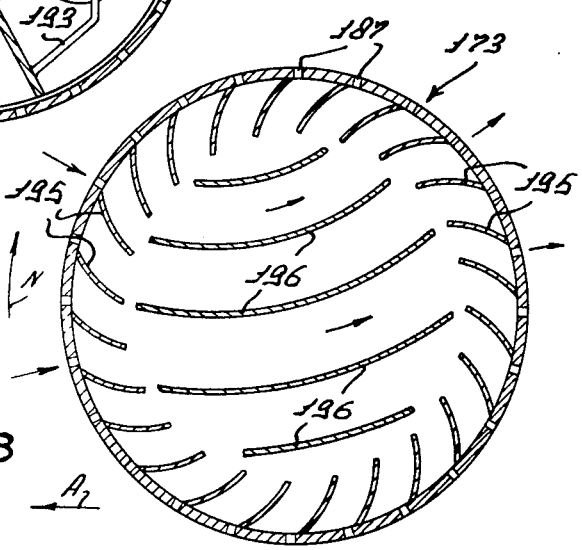
FIG. 18 shows a second modification of the construction shown in the sectional view of FIG. 15.

FIG. 18 shows schematically a further potential embodiment of a machine in accordance with the invention illustrated in FIGS. 13 and 14. The cylinder 173, rotating in operation, is provided on its inner surface with a great number of uniformly distributed blades 195. The cylinder 173 and blades 195 may be directly secured to pulley 166. In the space defined by the inner boundaries of blades 195 a number of guide vanes 196, for example five guide vanes, are directly secured, for example, to supports 167 and 180 so that in operation these vanes are not rotating. From FIG. 18 it will be apparent that vanes 196 are curved so that at both ends they join the inner sides of blades 195 fastened to cylinder 173 and rotating on either side of vanes 196 in the direction N. The vanes 196 extend the whole axial length of cylinder 173.

When cylinder 173 is driven, air will be drawn in at a section region on the front and bottom sides through apertures 187 by blades 195 and stationary guide vanes 196 will guide this air in the direction of vanes 196 towards the rotating blades 195 on the rear side of the cylinder, viewed in the direction of movement A, so that the air is blown out at a nonsuction region on the rear side through openings 187. When the cylinder is moved in the direction A, stalks will be attracted to the front and bottom sides of the cylinder 173 and be carried in the direction N. These stalks are blown off the cylinder on the rear side into the gutter formed by the plate construction 157 and owing to the inclined position of said gutter the stalks are deposited in a swath behind the machine.

The embodiments described may be employed not only in the above-mentioned haymaking or tedding machines but also as pick-up devices for stalks and stems associated with other machines such as charging wagons, balers, crushers, combined mowing and threshing machines and the like.

The pick-up and displacing devices for stalks and stems according to the invention ensure that the stalks are efficiently picked up and substantially no stalk part will be left on the ground, while due to the absence of tines as crop displacing members the field will not receive broken-off pieces of tines, which may hinder the operation of other machines such as forage harvesters. The machines according to the invention furthermore permit of working at high speed without stalks being left behind.

In the four described embodiments of the invention, some features, such as the type of rotor, the number of rotors, the linkage for connecting the machine to a tractor and the guide arrangements for forming swaths have been described and illustrated in connection in different forms in the different embodiments. However, it will be appreciated that a form of a feature shown in connection with one embodiment could equally well be used with one or more of the other embodiments.

Although various features of the agricultural machines described and illustrated in the drawings, will be set forth in the following claims as inventive features, it is to be noted that the invention is not necessarily limited to these features and may encompass all of the features described both individually and in various combinations.

I claim:

1. A mobile agricultural machine for the displacement of crop, said machine comprising a pair of spaced apart air-permeable rotatable screens which each define an interior air chamber, means for rotating said screens in opposite directions towards each other relative to the normal direction of travel of said machine, air evacuation means located in each said chamber for providing that the air pressure in each said chamber is less than the air pressure surrounding said chambers whereby air flows into each chamber through its corresponding permeable screen to draw crop against each said air-permeable screen, said crop being thereafter displaced by the rotation of each of said air-permeable screens.

2. An agricultural machine for the displacement of crop such as stalks comprising at least one rotatable air-permeable screen, said screen being generally circular and comprising an outer curved surface with apertures, air displacing means situated within an air chamber within the perimeter of said surface and causing the suction of air into said chamber through said apertures, air blocking means being positioned within said chamber between a part of said surface and said air displacing means, said air blocking means selectively covering a section of said screen and the apertures therein thereby substantially eliminating the suction of air through said screen and said apertures in the region of said air blocking means, whereby as said screen rotates crop adheres to the unblocked region of said screen and is deposited therefrom adjacent the blocked region of said screen.

3. An agricultural device for moving crop lying on the ground, said device comprising a circular chamber as seen in plan having perforations about its periphery, means to rotate said chamber about a substantially vertical axis, air evacuation means positioned in said chamber including air discharge means therefrom under said chamber actuated by the rotation of said chamber, said air evacuation means blowing air from said chamber radially out of said air discharge means thereby causing air to move outwardly under said chamber towards said perforations and urging loose crop under said chamber to be drawn against said perforations.

4. An agricultural machine for the displacement of crop lying on the ground, said machine comprising an air chamber which is defined at least in part by a surrounding rotatable air-permeable screen located only in the lower region of said air chamber whereby during operation said air-permeable screen is adapted to rotate proximate crop lying on the ground, means for rotating said air-permeable screen about a substantially vertical axis, air evacuation means associated with said chamber for providing that the air pressure in said chamber is less than the air pressure surrounding said chamber whereby air is drawn into said chamber through said air-permeable screen and crop is drawn from the underlying ground against said air-permeable screen and thereafter is displaced by its rotation.

5. An agricultural machine in accordance with claim 4, wherein said air-permeable screen is at its lower aspect curved inwardly towards said vertical axis.

6. An agricultural machine for the displacement of crop such as piles of hay or the like lying on the ground, said machine comprising an air chamber which is defined at least in part by a surrounding rotatable screen which during operation is adapted to rotate proximate crop lying on the ground, said screen being provided with a large number of apertures, the distances between said apertures being of the same order of magnitude but irregular in nature, means for rotating said screen about a substantially vertical axis, air evacuation means associated with said chamber for providing that the air pressure in said chamber is less than the air pressure surrounding said chamber whereby air is drawn into said chamber through said apertures in said screen and crop such as piles of hay or the like irrespective of its density or mass is drawn from the underlying ground against said apertures in said screen and thereafter is displaced by its rotation.

* * * * *